UNITED STATES PATENT OFFICE.

LUDWIG BRUMLEN, OF HOBOKEN, NEW JERSEY.

MANUFACTURE OF OXYCHLORID OF LEAD.

Specification of Letters Patent No. 31,224, dated January 29, 1861.

*To all whom it may concern:*

Be it known that I, LUDWIG BRUMLEN, of Hoboken, county of Hudson, State of New Jersey, have invented a new and Improved Mode of Manufacturing Oxychlorid of Lead, of which the following is a specification.

To enable others skilled in the art to understand my invention for the manufacture of oxychlorid of lead I will describe the same.

The process of making oxychlorid of lead is based upon the fact that chlorid of lead and subacetate of lead decompose each other and alter their respective proportions so that chlorid of lead is reduced to oxychlorid and the subacetate of lead becomes neutral. When therefore muriatic acid is introduced into liquid subacetate of lead, chlorid of lead is formed in the first instance, but this by agitation will be brought into contact with the subacetate of lead contained in the same tub or tank and immediately formed into oxychlorid of lead until all the subacetate of lead has been reconverted into a neutral acetate of lead. Therefore to apply this method to the manufacture of oxychlorid of lead, take subacetate of lead made in any of the known and usual methods, and precipitate therefrom oxychlorid of lead by the introduction of muriatic acid gradually under constant agitation, until blue litmus paper begins to show symptoms of becoming red, which is a proof that the liquid is becoming neutral. At this point the introduction of muriatic acid must cease or a mere chlorid of lead will be formed. The oxychlorid of lead will then in a few hours settle to the bottom of the tub or tank, when the neutral acetate of lead may be drawn off and may be used over and over for the making of subacetate of lead and which subacetate of lead by the introduction of muriatic acid forming the oxychlorid of lead is again reconverted to acetate of lead over and over by the same process. The oxychlorid of lead thus formed, after the neutral acetate of lead has been drawn off may then be washed, dried, and prepared for sale.

Having thus described my invention what I desire to secure by Letters Patent is—

The process as set forth in the foregoing description of manufacturing oxychlorid of lead from subacetate of lead by the introduction of muriatic acid leaving in solution neutral acetate of lead free to be used over and over for the same purpose.

LUDWIG BRUMLEN.

Witnesses:
HENRY WHINFIELD,
J. M. H. ESDARLE.